United States Patent
Klinghult et al.

(10) Patent No.: US 7,893,922 B2
(45) Date of Patent: Feb. 22, 2011

(54) TOUCH SENSOR WITH TACTILE FEEDBACK

(75) Inventors: Gunnar Klinghult, Lund (SE); Mats Wernersson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 853 days.

(21) Appl. No.: 11/623,183

(22) Filed: Jan. 15, 2007

(65) Prior Publication Data
US 2008/0169911 A1 Jul. 17, 2008

(51) Int. Cl.
*G09G 5/00* (2006.01)
(52) U.S. Cl. .................................. 345/156; 178/17 C
(58) Field of Classification Search ............... None
See application file for complete search history.

(56) References Cited

U.S. PATENT DOCUMENTS

| | | | | |
|---|---|---|---|---|
| 717,865 A | * | 1/1903 | Juhlin | 116/172 |
| 4,706,330 A | * | 11/1987 | Sampson | 16/48.5 |
| 4,742,198 A | * | 5/1988 | Martin et al. | 200/296 |
| 4,806,815 A | * | 2/1989 | Honma | 310/307 |
| 4,885,565 A | | 12/1989 | Embach | |
| 4,899,631 A | * | 2/1990 | Baker | 84/719 |
| 5,139,454 A | * | 8/1992 | Earnest | 446/150 |
| 5,184,319 A | * | 2/1993 | Kramer | 703/5 |
| 6,218,966 B1 | | 4/2001 | Goodwin et al. | |
| 6,337,678 B1 | * | 1/2002 | Fish | 345/156 |
| 6,525,711 B1 | | 2/2003 | Shaw et al. | |
| 6,693,626 B1 | * | 2/2004 | Rosenberg | 345/168 |
| 2005/0069842 A1 | * | 3/2005 | Schleppenbach et al. | 434/113 |
| 2007/0171207 A1 | * | 7/2007 | Wernersson | 345/169 |

FOREIGN PATENT DOCUMENTS

FR 2 718 266 10/1995

OTHER PUBLICATIONS

International Search Report and Written Opinion for corresponding Application No. PCT/EP2007/057263.

* cited by examiner

*Primary Examiner*—Alexander Eisen
*Assistant Examiner*—Matthew Yeung
(74) *Attorney, Agent, or Firm*—Renner, Otto, Boisselle & Sklar, LLP (57) ABSTRACT

An input organ, being provided with means for detecting the touch of a fingertip, where said organ is provided with means for providing a tactile feedback to said fingertip to acknowledge an activation of said input organ, and where said means for providing a tactile feedback comprises an elongate object of shape memory metal.

14 Claims, 8 Drawing Sheets

TOUCH SENSOR WITH TACTILE FEEDBACK

TECHNICAL FIELD OF THE INVENTION

The present invention relates to the field of manually operable input organs or manoeuvre organs, such as keys, keyboards and touch sensors. In particular, it relates to such organs provided with means for providing a tactile feedback when activated.

STATE OF THE ART

Keyboards for electronic devices, such as mobile phones etc, come in a wide variety. The keyboard forms part of the so called Man Machine Interface of the electronic device. It is an object of the present invention to develop better and/or more cost efficient keys, keyboards and touch sensors.

Today many keyboards deliver a certain feel or sensation when a key is depressed. The response to the depressing action is often also accompanied with a click-sound or other sound to acknowledge the depressing. However, new and different methods to provide a user with feedback could give the manufacturer advantages on the market.

SUMMARY OF THE INVENTION

It should be emphasised that the term "comprises/comprising" when used in this specification is taken to specify the presence of stated features, integers, steps or components but does not preclude the presence or addition of one or more other features, elements, integers, steps, components or groups thereof.

Features that are described and/or illustrated with respect to one embodiment may be used in the same way or in a similar way in one or more other embodiments and/or in combination with or instead of the features of the other embodiments.

In the present invention, the problem of providing feedback from a touch sensor is solved by providing a touch surface of the touch sensor with a mechanical coupling to a so called muscle wire, which is a piece of memory metal, and means for activating the muscle wire when the touch sensor is touched, thereby creating a tactile feedback.

According to one aspect of the present invention an input organ is provided, having means for detecting the touch of a fingertip, where said organ is provided with means for providing a tactile feedback to said fingertip to acknowledge an activation of said input organ, and where said means for providing a tactile feedback comprises a muscle wire.

According to another aspect an input organ is provided, where a muscle wire is arranged to be energised when said organ is touched by a fingertip to such an extent that said wire contracts and mechanical energy resulting from said contraction is mediated to a touch surface of said input organ, arranged to make contact with said fingertip. Within this input organ, the muscle wire is arranged to convey a motion directed towards the fingertip. The input organ may also comprise a first and a second muscle wire, independently controllable, where the first muscle wire is arranged to convey mechanical energy as a motion via said touch surface towards the finger tip, and the second muscle wire is arranged to convey a motion of said touch surface away from said fingertip. The conveying of a motion is preferably achieved by arranging the first wire under and parallel to the touch surface and as a taut string between two supports and letting a key stem contacting the wire approximately at the middle of its length, conveying the increased tension in the muscle wire to the key stem, as would a bowstring to an arrow, and further to the touch surface.

According to another aspect an input organ is provided, where a touch sensor is connected to a touch determination device for deciding when the input organ is touched, the touch determination device is further connected to an input of, and provides control signals to, a muscle wire heating unit having an output connected to the muscle wire for providing suitable heating current to the muscle wire.

According to yet another aspect an input organ is provided where tactile feedback in the form of mechanical energy is mediated to a touch surface of said input organ as a mechanical energy selected from a tactile feedback patterns group consisting of: one short twitch, two or more short twitches, vibration of one or different frequencies, and vibration of rising and falling amplitude, and combinations thereof.

According to another aspect a device is provided controlled from a keypad provided with tactile feedback where different events resulting from pressing the keypad give rise to different tactile feedback patterns.

BRIEF DESCRIPTION OF THE DRAWINGS

The invention will be described in detail below with reference to the accompanying drawings, in which.

DETAILED DESCRIPTION OF PREFERRED EMBODIMENTS

Definition

In this application the term muscle wire is used to denote an elongate object of shape memory metal, e.g. nickel-titanium alloy. Trademarks are Nitinol or Flexinol.

Figure 1:
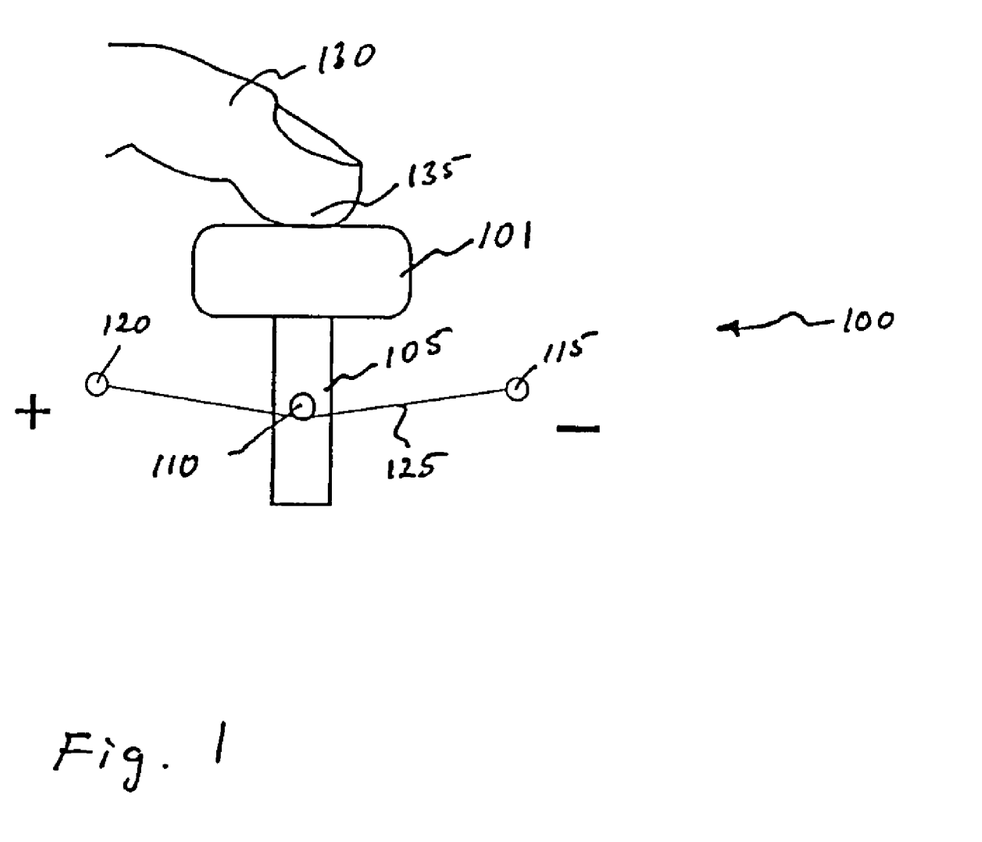
FIG. 1 shows a key mechanically coupled to a muscle wire, according to one embodiment of the invention.

FIG. 1 shows a key device 100 with a key 101 having a key stem 105 with a pin 110 sticking out from said stem, and a muscle wire 125 arranged between two attachment point 120, 115, which attachment points also serve as electrical feeding points "+", "−" for said muscle wire 125. The muscle wire is arranged to run under the pin 110 of the key stem 105, such that when the muscle wire contracts, as a result of an electrical current warming it up, the pin 110 is mechanically forced upwards, bringing the key stem 105 and key 101 with it, such that this in this way conveyed mechanical energy, is perceived as a sensation by the sense of touch of a finger tip 135 of a finger 130 of an operator.

Figure 2:
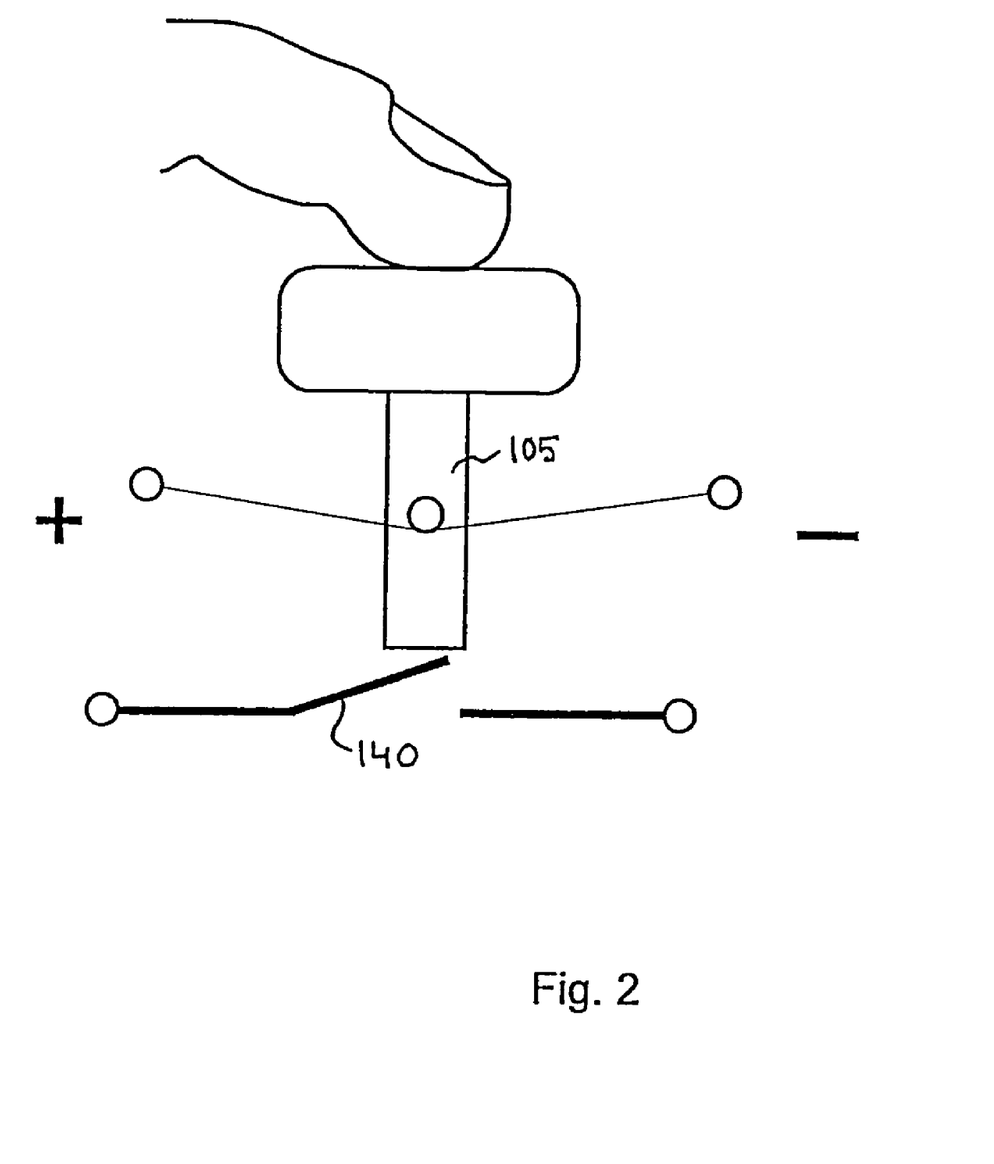
FIG. 2 shows the key of FIG. 1 arranged to close a switch.

FIG. 2 shows the key device of FIG. 1 further showing a mechanical switch 140 arranged to be engaged by the key stem 105 when the key 101 is depressed.

Figure 3:
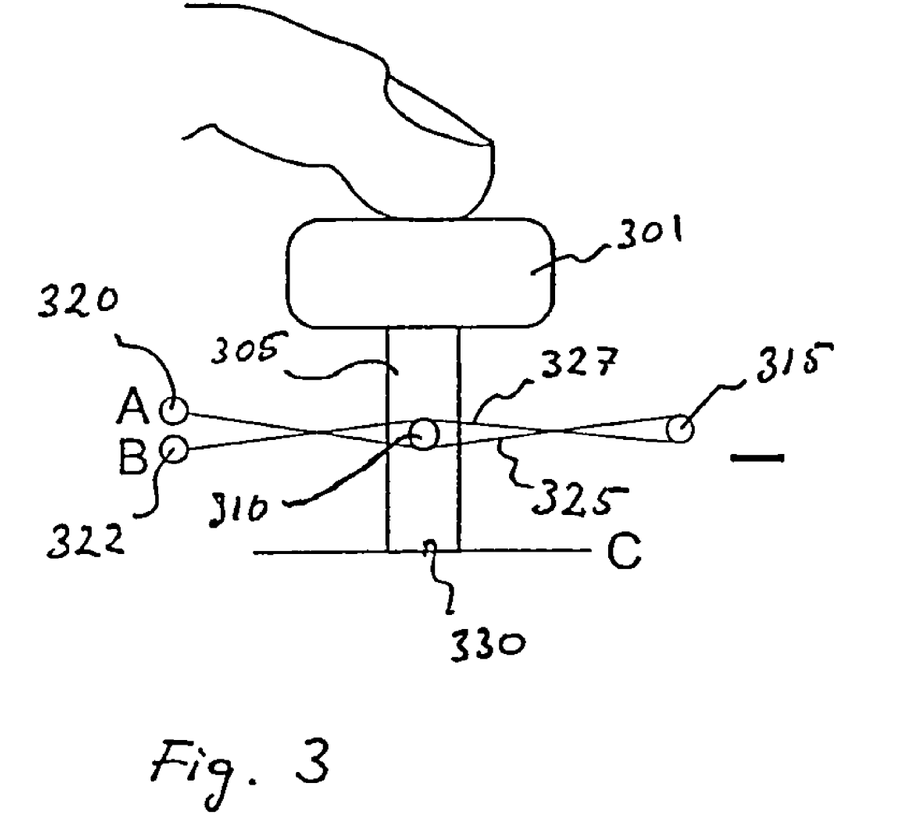
FIG. 3 shows a key mechanically coupled to two muscle wires according to another embodiment of the invention.

FIG. 3 shows a key device with a key 301 mechanically coupled to two muscle wires 325, 327. A key stem is provide with a pin approximately half way between a key end of said stem and attached to the key, and a far end 330 of said key stem 305 making contact with an object "C", which "C" is a membrane which act both as an electrical switch and as membrane providing springback and/or resilient functionality to the key.

A first muscle wire 325 is arranged between a first attachment point 320 and a second attachment point 315 provided on each side of said key stem 305, such that said first muscle wire 325 runs from the first attachment point 320, under a pin 310 attached to the key stem 305, such that when the muscle wire is energised, i.e. an electrical current is made to flow from a first connection point A through the first wire 325 to a second connection point "−", the first muscle wire contracts and forces the key stem upwards. Simultaneously a second wire, arranged to run from a third attachment point 322 to the second attachment point 315 over the horizontal pint 310, is mechanically forced to adopt a longer shape and length due to the movement of the horizontal pin 310.

Figure 4:
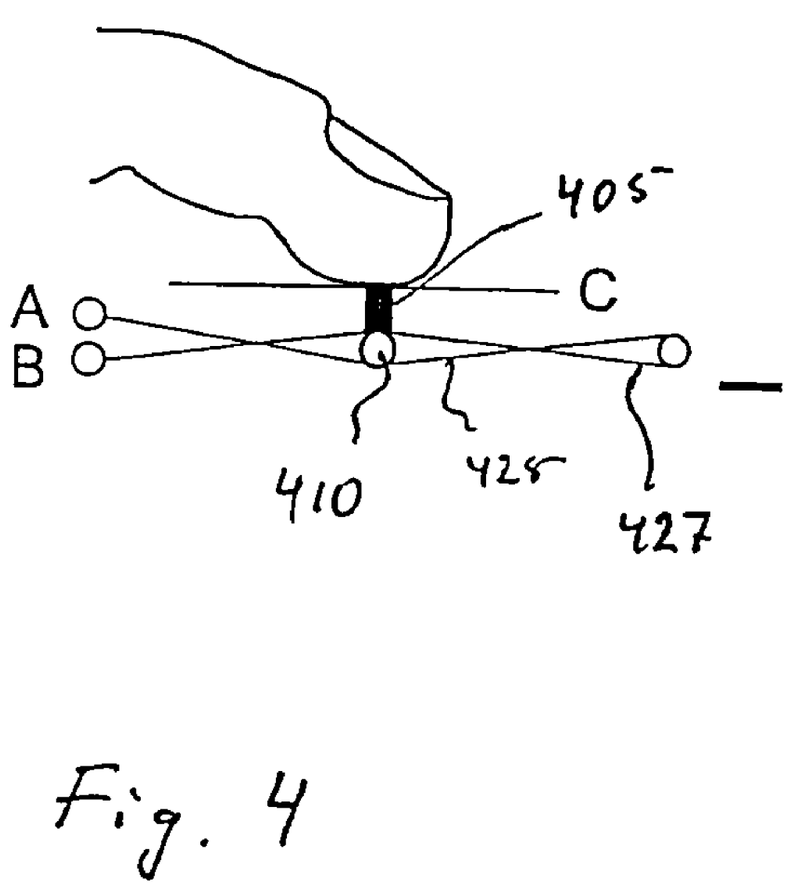
FIG. 4 shows a touch sensor mechanically coupled to two muscle wires.

FIG. 4 shows a touch sensor mechanically coupled to two muscle wires. A touch sensitive membrane C is provided with a rod 405, in contact with or attached to the underside of the touch sensitive membrane C, said rod being provided with a pin or another suitable organ having a contact surface suitable for a muscle wire to make contact to. The pin is preferably electrically isolating. In the alternative, a first muscle wire 425 and/or a second muscle wire 427 is provided with an electrically isolating cover. Preferably the muscle wires are non-isolated to facilitate cooling of said wires, and the pin is manufactured of a non-conducting material or covered or coated with a non-conducting material of a heat proof kind such as e.g. Teflon. As is explained below the first and second wires do not contact each other physically, but they are preferably arranged in different planes having a distance between them.

In the same way as described above, the first muscle wire is energised when the touch sensitive membrane is touched. This is achieved by means of an energising organ (not shown here but in FIG. 6) activated by the touch.

Figure 5A:
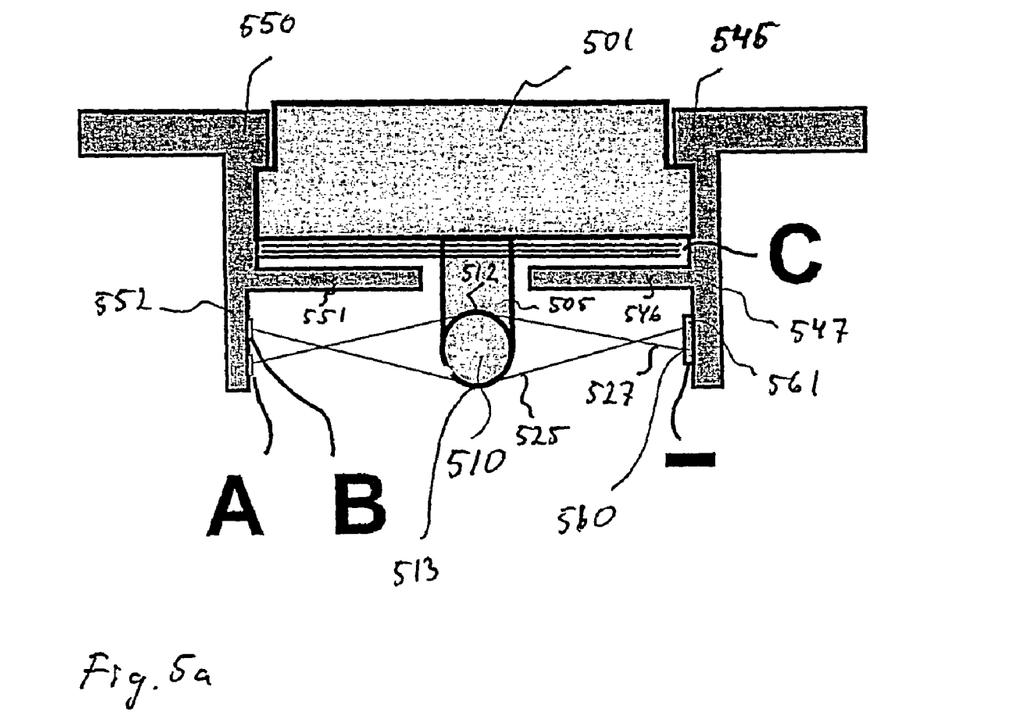
FIG. 5a shows a cross sectional view of a touch sensible device according to yet another embodiment of the invention.
Figure 5B:
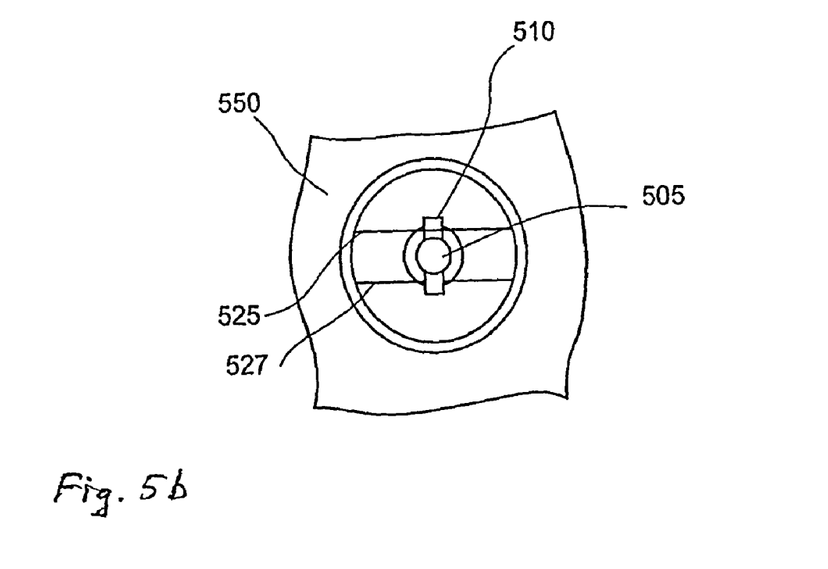
FIG. 5b shows the touch sensible device of FIG. 5a, in a view from below.

FIG. 5a, and 5b shows a touch sensible device according to another embodiment of the invention. Here, supporting structures 545, 550 can be seen, supporting a key 501 with a key stem 505 and a pin 510. A membrane or spring "C" provides a force upwards such that the key do not assume an undefined position when both muscle wires 525, 527 are in a non-active state, i.e., not energized. The spring "C" is provided under the key 501, pressable between the key 501 and lower horizontal portions 551, 546 of the supporting structures 550, 545. An electrical switch (not shown) is arranged to be engaged by the key 501, the key stem 505 or the pin 510. A preferred arrangement of the switch is under the key stem as shown in FIG. 2.

FIG. 5b shows the device of FIG. 5a from below. The key have a circular shape, i.e., the supporting structures 550, 545 are really the same structure. They do not connect in FIG. 5a because FIG. 5a shows a cross sectional view of the device. The muscle wires cross but do not contact each other because they are separated sideways as seen in FIG. 5b. The pin 510 extends through a bore in the key stem 510, or a pin can be arranged on each side of the key stem 512, to provide suitable structures for muscle wires 525, 527 to engage.

A first muscle wire 527 is arranged to run from a first attachment point A arranged at a first support structure (not shown here) below a first horizontal plane, the wire passing an upper bound 512 of the pin 510, making contact to said upper bound 512 of said pin 510, and the wire ending at a second attachment point 560 arranged at an opposite second support structure (not shown here) which second attachment point also is arranged below the first horizontal plane being tangent to the upper bound of the pin. The key stem being arranged between said first and second support structures.

Correspondingly, a second muscle wire 525 is arranged to run from a third attachment point B arranged higher or over a second horizontal plane, which plane being tangent to a lower bound 513 of the pin 510. The wire 525 further running under the pin, making contact to said lower bound 513, and further to a fourth attachment point 561 also arranged higher than said second horizontal plane but opposite to the third attachment point B.

The first attachment point may be equivalent to a first electrode A, capable of supplying the first muscle wire 527 with a first electrical current running from the first electrode A, through the first muscle wire 527 and to a second electrode "−" housing both the second and fourth attachment points 560, 561. The third attachment point may be equivalent with a third electrode B.

Figure 6:
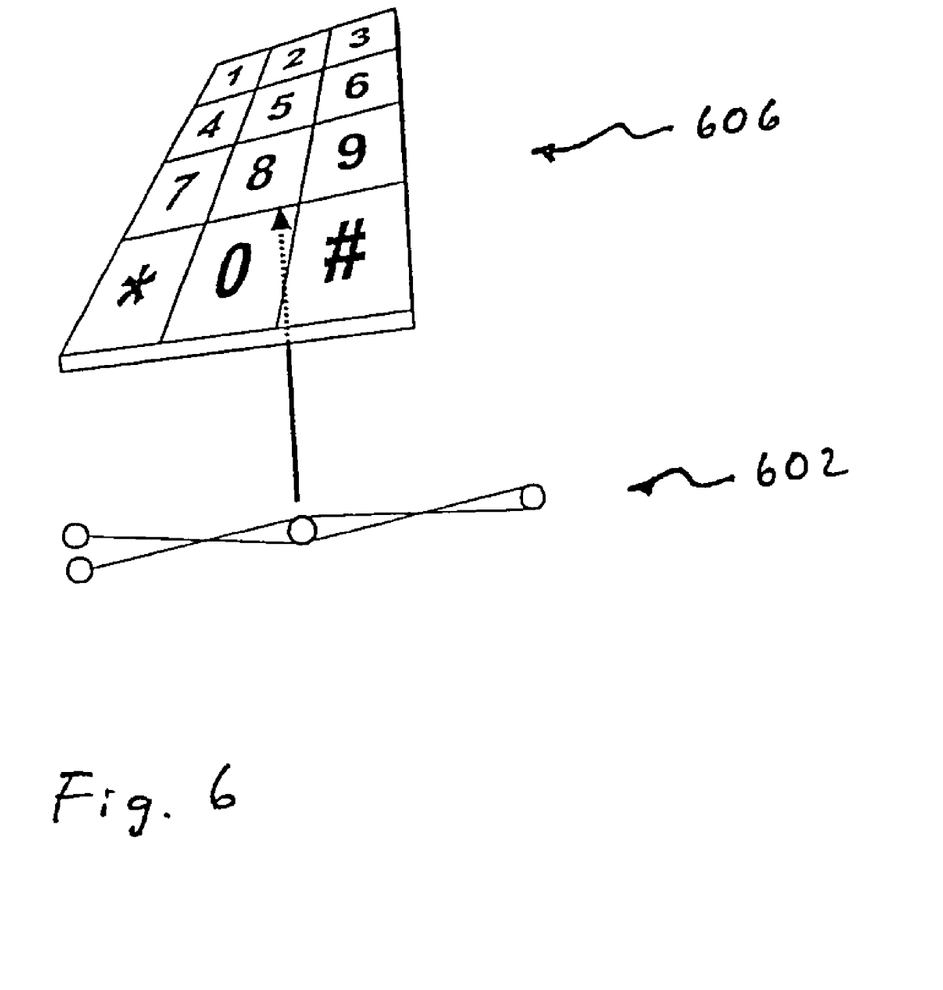
FIG. 6 shows a general view of a keypad with muscle wire activated tactile feedback.

FIG. 6 schematically illustrates that a muscle wire unit 602 is provided to equip a keypad 606 with a single tactile feedback device according to the embodiment of FIG. 5. A complete continuous keypad can be activated by a single muscle wire device. The muscle wires provides a snap feeling, or a pluck feeling to the fingers in contact with the keypad 606, and because the a user only depresses one single button, he or she will associate the feeling to that particular button. The muscle wires are preferably arranged to engage the keypad at its center, in this particular case close to the key "8". Here, the keypad 606 may be of conventional type with electrical switches for each key, but it may also be a panel with touch sensors, or a display with touch sensors.

Figure 7:
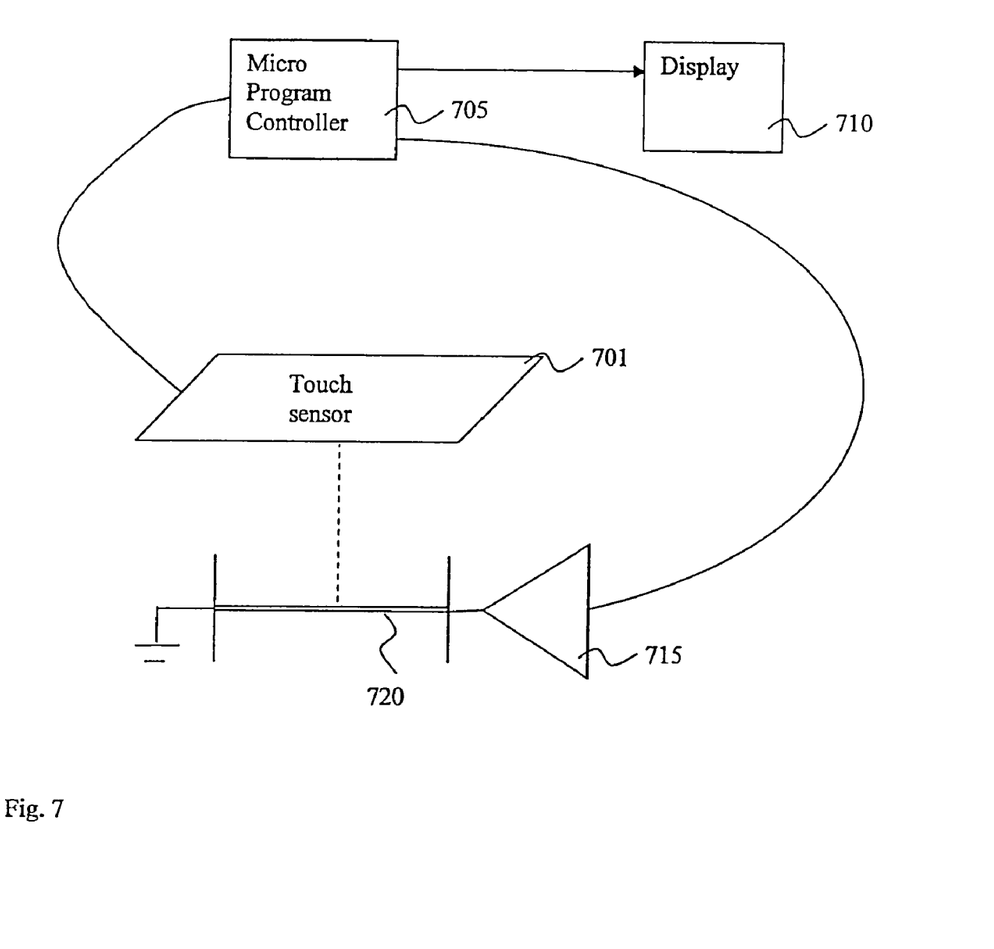
FIG. 7 is a general diagram of a driving circuitry for a touch sensor with tactile feedback.
Figure 8:
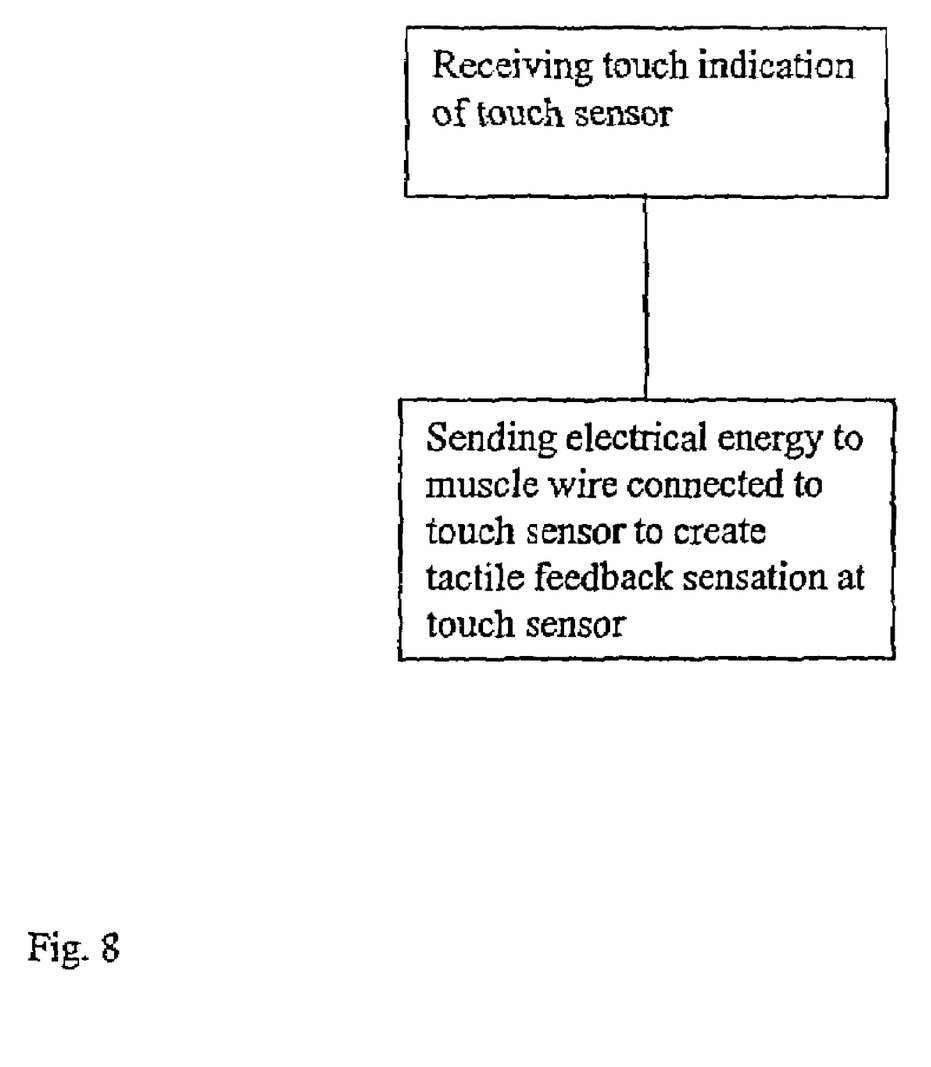
FIG. 8 is a flowchart describing a method for activating a touch sensor with tactile feedback.

FIG. 7 schematically shows how a muscle wire 720 is driven by muscle wire driving circuitry in a touch sensor with tactile feedback. A touch sensor 701 is connected to a touch determination device 705 in the form of a micro program controller 705 such that the micro program controller 705 receives an input signal from the touch sensor 701 when the touch sensor is touched. The micro program controller 705 is connected to a display for controlling the display based on the input signal. The micro program controller is also connected to a muscle wire heating unit in the form of an amplifier 715 for providing suitable voltage for controlling the activation of the muscle wire 720.

The micro program controller is provided with means for controlling the power and current to the muscle wire 720 such that a distinct tactile feedback is produced, see also below.

The muscle wire is fabricated from a material that changes shape or size when the material is heated beyond a particular temperature. The particular temperature needed to change the shape/size depends on the particular material. In one implementation, muscle wire 720 may be made of an alloy that is designed to contract (i.e. a fixed length becomes shorter) when the wire 720 is heated beyond a threshold temperature. In addition, the alloy may be fabricated to have poor conductivity (e.g. have resistive characteristics). In this manner, when power is applied to wire 720, the wire becomes heated beyond the threshold temperature, thereby causing wire 720 to contract. In an exemplary implementation, wire 720 may include alloys made from nickel and titanium that are known as "muscle wire" or "memory alloy". For example, wire 720 may be fabricated using NITINOL, FLEXINOL or similar materials.

Wire 720, consistent with the invention, may contract about 3% to 5% when heated beyond the threshold temperature. In an exemplary implementation, the threshold temperature may range from about 88 to 98 degrees Celsius. The wire 720, consistent with the invention, may also relax (i.e. return to the pre-heated state) at a temperature ranging from about 62 degrees to 72 degrees Celsius.

The table below illustrates exemplary characteristics of wire 720 that may be used in implementations consistent with the invention.

| Wire diameter (millimeters) | 0.05 | 0.125 |
|---|---|---|
| Resistance (ohms/meter) | 510 | 70 |
| Typical power (watts/meter) | 1.28 | 4.4 |
| Contraction speed at typical power (seconds) | 1 | 1 |
| Maximum recovery force (grams) | 117 | 736 |
| Deformation force (grams) | 8 | 43 |
| Heat capacity (Joules/g) | 0.32 | 0.32 |

In a typical application, the electrical energy fed to a muscle wire is a pulse of amplitude 5 Volts, a current of 300 mA during 70 ms.

The muscle wires in this application are preferably arranged to accomplish a suitable mechanical bias tension, such that taut wires are accomplished. This will facilitate fast reaction times of the tactile feedback.

Also provided is a method for providing a tactile feedback of a touch sensor, the method comprising the steps of:

Receiving an indication that a touch sensor is touched.

Providing, based on said indication, a signal for activating a muscle wire mechanically connected to the touch sensor for providing a mechanical influence on said touch sensor serving as a tactile feedback.

Said mechanical influence may be a short twitch, i.e. a short mechanical pulse of 30-140 ms, resulting in a motion of whole of or part of the touch sensor surface of approximately 0.2-0.4 mm. Other suitable tactile feedback patterns may include two or more short twitches, vibration of one or different frequencies, and vibration of rising and falling amplitude.

A device controlled from a keypad provided with tactile feedback according to the present invention may for example be a mobile station. Different events resulting from pressing the keypad may give rise to different tactile feedback patterns swiftly alerting the user of the equipment in question, of the result of a key being pressed. These mechanical patterns are controlled by feeding the muscle wires with appropriately varying voltages, causing the wires to heat up and contract in a way corresponding to the heating effect of the electrical current passing through the wire. Electrical current fed to the wire for causing a mechanical frequency may be an electrical current having alternating on and off periods corresponding to the desired frequency. A single twitch is generated by a single pulse.

The invention claimed is:

1. An input organ, comprising
means for detecting the touch of a fingertip,
a key stem movable in response to detecting the touch of a fingertip by the means for detecting,
a switch arranged to be operated in response to movement of the key stem,
means for providing a tactile feedback to the fingertip to acknowledge an activation of said input organ, and
wherein said means for providing a tactile feedback comprises elongate shape memory metal;
wherein the elongate shape memory metal comprises a first muscle wire arranged to be energised when the organ is touched by a fingertip to such an extent that said first muscle wire contracts and tactile feedback in the form of mechanical energy resulting from said contraction is mediated to a touch surface of said means for detecting arranged to make contact with the fingertip;
wherein the elongate shape memory metal comprises a second muscle wire,
said first and a second muscle wires being independently controllable,
wherein the first muscle wire is arranged to convey a motion of said touch surface towards the fingertip, and the second muscle wire is arranged to convey a motion of said touch surface away from said fingertip; and
wherein said conveying of a motion is achieved by the first muscle wire being arranged under and generally parallel to the touch surface as a taut string between two supports in position for the key stem contacting the first muscle wire approximately at the middle of its length whereby the increased tension in the first muscle wire is conveyed toward the touch surface, and
wherein said conveying of a motion is achieved by the second muscle wire being arranged under and generally parallel to the touch surface as a taut string between two supports in position for the key stem contacting the second muscle wire approximately at the middle of its length whereby increased tension in the second muscle wire is conveyed away from the touch surface.

2. The input organ according to claim 1, wherein a touch sensor is connected to touch determination device configured to decide when the input organ is touched, the touch determination device is further connected to an input of, and provides control signals to, a muscle wire heating unit having an output connected to at least one of the muscle wires for providing suitable heating current to the muscle wire.

3. The input organ according to claim 1 where tactile feedback in the form of mechanical energy is mediated to a touch surface of said means for detecting as a mechanical energy selected from a tactile feedback patterns group consisting of: one short twitch, two or more short twitches, vibration of one or different frequencies, and vibration of rising and falling amplitude, and combinations thereof.

4. A device controlled from a keypad provided with tactile feedback from an input organ according to claim 1, wherein different events resulting from pressing the keypad give rise to different tactile feedback patterns.

5. The input organ according to claim 1, wherein the key stem includes a pin, and wherein the first muscle wire runs under the pin to convey a motion of said touch surface towards the fingertip and the second muscle wire runs over the pin to convey a motion of said touch surface away from the fingertip.

6. The input organ according to claim 1, wherein the first and second muscle wires do not physically touch each other.

7. The input organ according to claim 1, wherein the first and second muscle wires are spaced apart from each other.

8. The input organ according to claim 1, further comprising a mechanical switch configured to be engaged by the key stem when the key stem is moved in response to a detected touch.

9. The input organ according to claim 1, further comprising a protrusion extending from the key stem.

10. The input organ according to claim 9, wherein the protrusion comprises a pin.

11. The input organ according to claim 9, wherein the key stem has respective opposite ends and the protrusion is approximately half way between the opposite ends of the key stem.

12. The input organ according to claim 9, wherein one of the muscle wires extends relatively above the protrusion and the other of the muscle wires extends relatively beneath the protrusion.

13. The input organ according to claim 12, wherein the protrusion has respective portions that extend in generally opposite directions from the key stem, and wherein one muscle wire engages the protrusion that extends in one direction and the other muscle wire engages the protrusion that extends in the relatively opposite direction from the one direction.

14. The input organ according to claim 12, wherein the muscle wires engage the protrusion and in response to contracting of a respective muscle wire such contracting muscle wire interacts with the protrusion to convey motion to the key stem via the protrusion.

* * * * *